(12) United States Patent  
Choi et al.

(10) Patent No.: US 8,446,872 B2  
(45) Date of Patent: May 21, 2013

(54) COMMUNICATION TERMINAL, COMMUNICATION DEVICE, METHOD FOR DATA COMMUNICATION, AND METHOD FOR FREQUENCY ALLOCATION

(75) Inventors: Hyung-Nam Choi, Hamburg (DE); Maik Bienas, Braunschweig (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 261 days.

(21) Appl. No.: 12/818,192

(22) Filed: Jun. 18, 2010

(65) Prior Publication Data

US 2011/0312328 A1   Dec. 22, 2011

(51) Int. Cl.
*H04W 4/00* (2009.01)

(52) U.S. Cl.
USPC .......................................... 370/330

(58) Field of Classification Search
None
See application file for complete search history.

(56) References Cited

U.S. PATENT DOCUMENTS

| | | | | |
|---|---|---|---|---|
| 7,860,502 | B2* | 12/2010 | Kim et al. | 455/436 |
| 8,045,924 | B2* | 10/2011 | Cho et al. | 455/63.1 |
| 2008/0051096 | A1 | 2/2008 | Rao | |
| 2008/0153530 | A1* | 6/2008 | Cho et al. | 455/513 |
| 2009/0042593 | A1 | 2/2009 | Yavuz et al. | |
| 2009/0233544 | A1* | 9/2009 | Oyman et al. | 455/7 |
| 2010/0157935 | A1* | 6/2010 | Imamura | 370/330 |
| 2010/0238816 | A1* | 9/2010 | Suh et al. | 370/252 |
| 2010/0238853 | A1* | 9/2010 | Zhou et al. | 370/315 |

FOREIGN PATENT DOCUMENTS

WO   2009055619 A1   4/2009

OTHER PUBLICATIONS

3GPP TS 36.211, V8.6.0 (Mar. 2009), 3rd Generation Partnership Project; Technical Specification Group Radio Access Network; Evolved Universal Terrestrial Radio Access (E-UTRA); Physical Channels and Modulation (Release 8), pp. 1-83.
3GPP TS 36.331, V8.6.0 (Jun. 2009), 3rd Generation Partnership Project; Technical Specification Group Radio Access Network; Evolved Universal Terrestrial Radio Access (E-UTRA); Radio Resource Control (RRC); Protocol specification (Release 8), pp. 1-207.
3GPP TS 36.304, V8.7.0 (Sep. 2009), 3rd Generation Partnership Project; Technical Specification Group Radio Access Network; Evolved Universal Terrestrial Radio Access (E-UTRA); User Equipment (UE) procedures in idle mode (Release 8), pp. 1-30.
3GPP TR 36.814, V1.5.0 (Nov. 2009), 3rd Generation Partnership Project; Technical Specification Group Radio Access Network; Further Advancements for E-UTRA; Physical Layer Aspects (Release 9), pp. 1-53.

(Continued)

*Primary Examiner* — Fan Ng

(57) ABSTRACT

A communication terminal is described comprising a determiner configured to determine, for a frequency region, a plurality of first communication devices from which the communication terminal receives a signal via the frequency region; a selector configured to select at least one of the first communication devices based on a predetermined interference criterion; a signal generator configured to generate a signal with an identification of the at least one selected first communication device; and a transceiver configured to transmit the signal to a second communication device, to receive an indication from the second communication device specifying whether the communication terminal should use the frequency region for data communication with the second communication device, and to carry out data communication with the second communication device using the frequency region depending on the indication.

16 Claims, 13 Drawing Sheets

OTHER PUBLICATIONS

3GPP TS 36.101, V8.8.0 (Dec. 2009), 3rd Generation Partnership Project; Technical Specification Group Radio Access Network; Evolved Universal Terrestrial Radio Access (E-UTRA); User Equipment (UE) radio transmission and reception (Release 8), pp. 1-160.

Luis G. U. Garcia et al., Autonomous Component Carrier Selection: Interference Management in Local Area Environments for LTE-Advanced, IEEE Communications Magazine, Sep. 2009, p. 110-116, vol. 47.

* cited by examiner

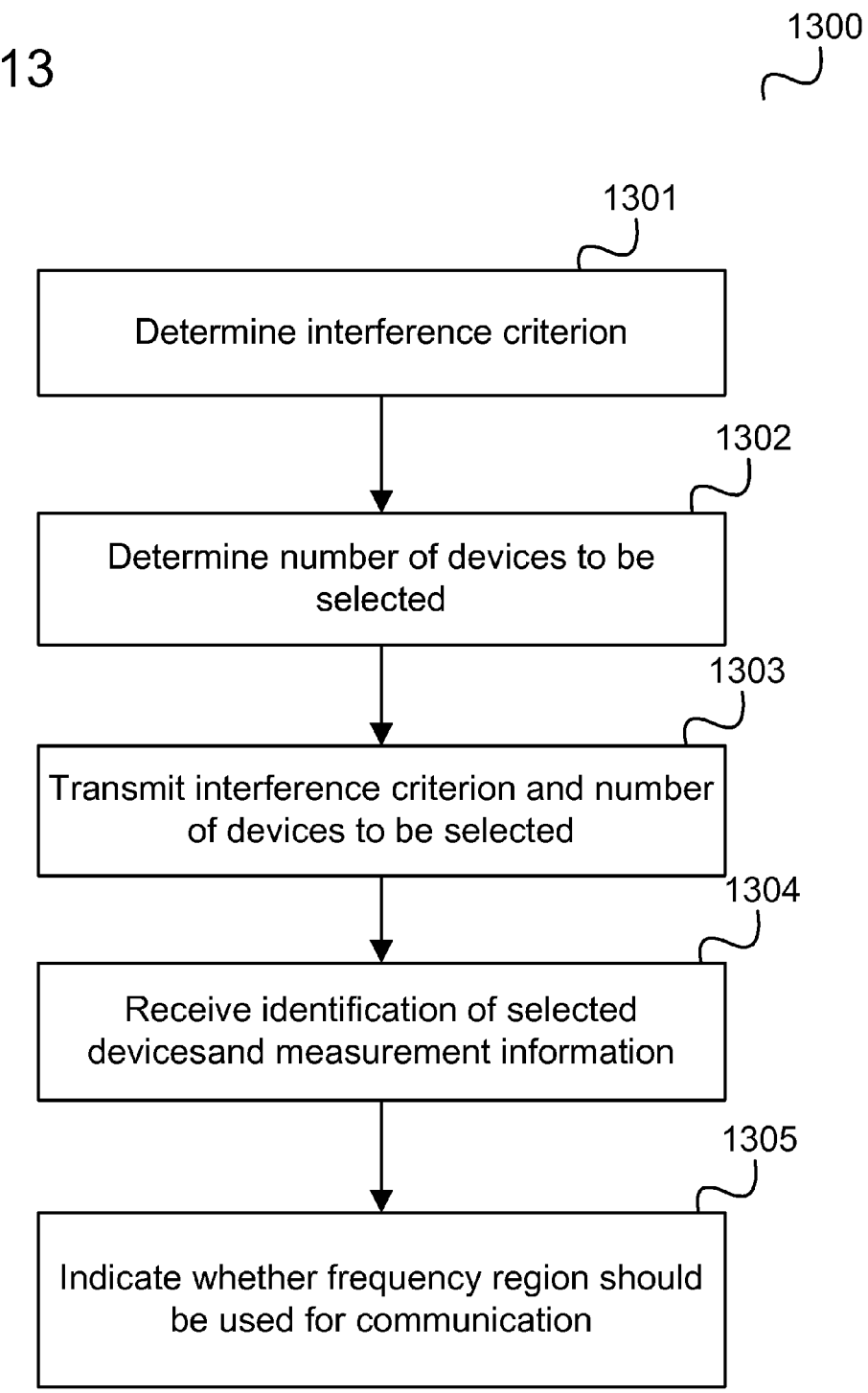

US 8,446,872 B2

COMMUNICATION TERMINAL, COMMUNICATION DEVICE, METHOD FOR DATA COMMUNICATION, AND METHOD FOR FREQUENCY ALLOCATION

TECHNICAL FIELD

Embodiments generally relate to a communication terminal, a communication device, a method for data communication, and a method for frequency allocation.

BACKGROUND

3GPP (3rd Generation Partnership Project) has introduced LTE (Long Term Evolution) into the Release 8 version of UMTS (Universal Mobile Telecommunications System) standards. With LTE, the UMTS air interface is further optimized for packet data transmission by improving the system capacity and the spectral efficiency.

A current topic in the 3GPP standardization fora is the further advancement of LTE (Long Term Evolution) into the Release 10 version of UMTS standards in terms of spectral efficiency, cell edge throughput, coverage and latency, also referred to as LTE-Advanced. One of the key characteristics of LTE-Advanced is the support of bandwidths >20 MHz and up to 100 MHz by spectrum aggregation, i.e. the bandwidth of an LTE-Advanced (LTE-A) radio cell is divided into a number of so-called component carriers (CC), wherein the bandwidth size of each component carrier is limited to a maximum of 20 MHz. Efficient methods for radio resource allocation for data communication, such as component carrier allocation for mobile terminals, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 13 shows a flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

3GPP (3rd Generation Partnership Project) has introduced LTE (Long Term Evolution) into the Release 8 version of UMTS (Universal Mobile Telecommunications System) standards. With LTE the UMTS air interface is further optimized for packet data transmission by improving the system capacity and the spectral efficiency. Amongst others, the maximum net transmission rate is increased significantly, namely to 300 Mbps in the downlink transmission direction and to 75 Mbps in the uplink transmission direction. Further, LTE supports scalable bandwidths of 1.4, 3, 5, 10, 15, and 20 MHz and is based on the multiple access methods OFDMA/TDMA (orthogonal frequency division multiple access/time division multiple access) in downlink and SC-FDMA/TDMA (single carrier-frequency division multiple access/TDMA) in uplink. OFDMA/TDMA is a multicarrier multiple access method in which a subscriber is provided with a defined number of subcarriers in the frequency spectrum and a defined transmission time for the purpose of data transmission. The RF bandwidth capability of an LTE UE (user equipment) for transmission and reception has been set to 20 MHz. A physical resource block (PRB) is the baseline unit of allocation for the physical channels defined in LTE. A physical resource block includes a matrix of 12 subcarriers by 6 or 7 OFDMA/SC-FDMA symbols. A pair of one OFDMA/SC-FDMA symbol and one subcarrier is denoted as resource element.

Figure 1:
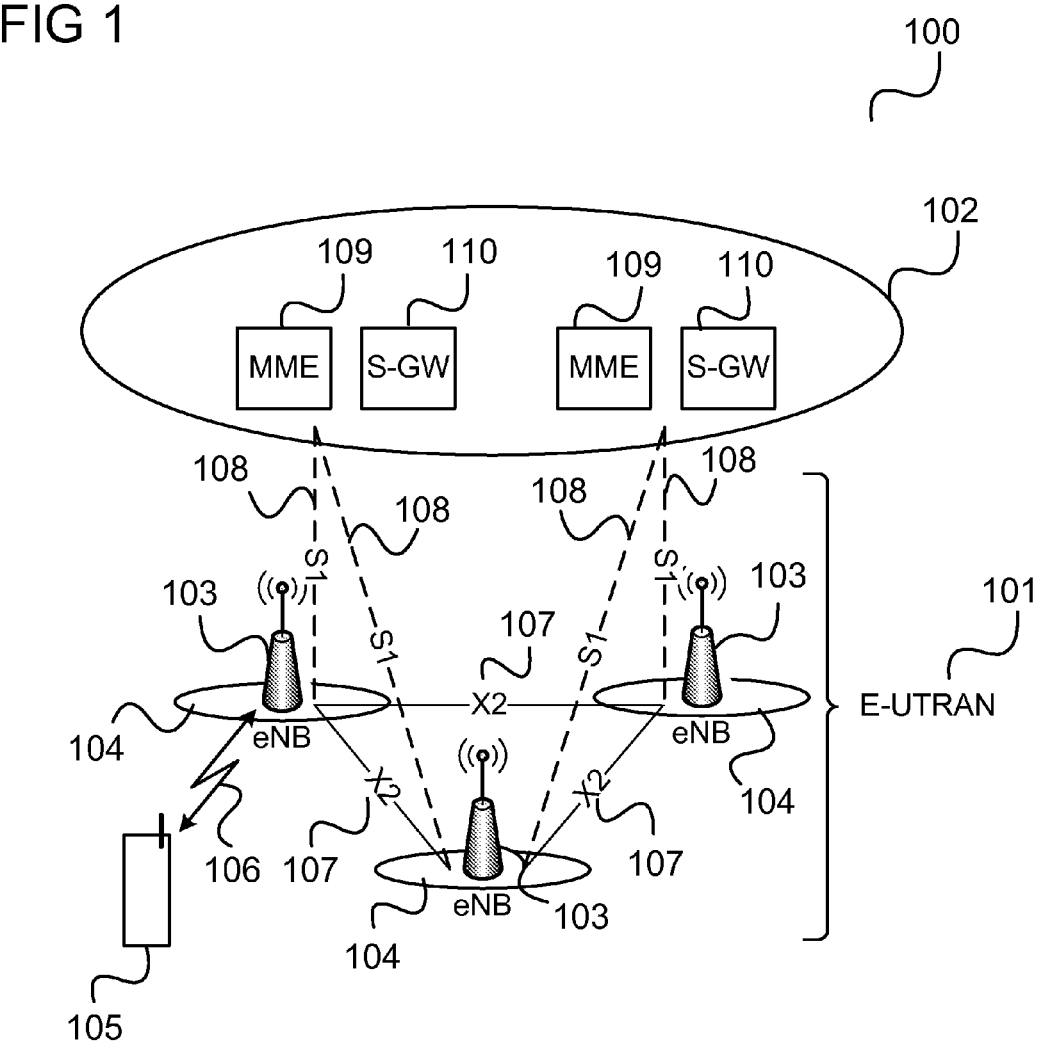
FIG. 1 shows a communication system according to an embodiment.

FIG. 1 shows a communication system 100 according to an embodiment.

According to this embodiment, the communication system 100 is configured in accordance with the network architecture of LTE.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

In one embodiment, according to LTE, the communication system 100 supports the following types of duplexing methods: full-duplex FDD (frequency division duplexing), half-duplex FDD and TDD (time division duplexing). According to full-duplex FDD two separate frequency bands are used for uplink transmission (i.e. transmission from mobile terminal 105 to base station 103) and downlink transmission (i.e. transmission from base station 103 to mobile terminal 105) and both transmissions can occur simultaneously. According to half-duplex FDD also two separate frequency bands are used for uplink and downlink transmissions, but both transmissions are non-overlapping in time. According to TDD the same frequency band is used for transmission in both uplink and downlink. Within a time frame the direction of transmission may be switched alternatively between downlink and uplink.

Data transmission between the mobile terminal 105 and the corresponding base station 103 (i.e. the base station operating the radio cell in which the mobile terminal 105 is located) is carried out in accordance with a (radio) frame structure. An example for a frame structure, denoted as frame structure type 1, is shown in FIG. 2.

Figure 2:
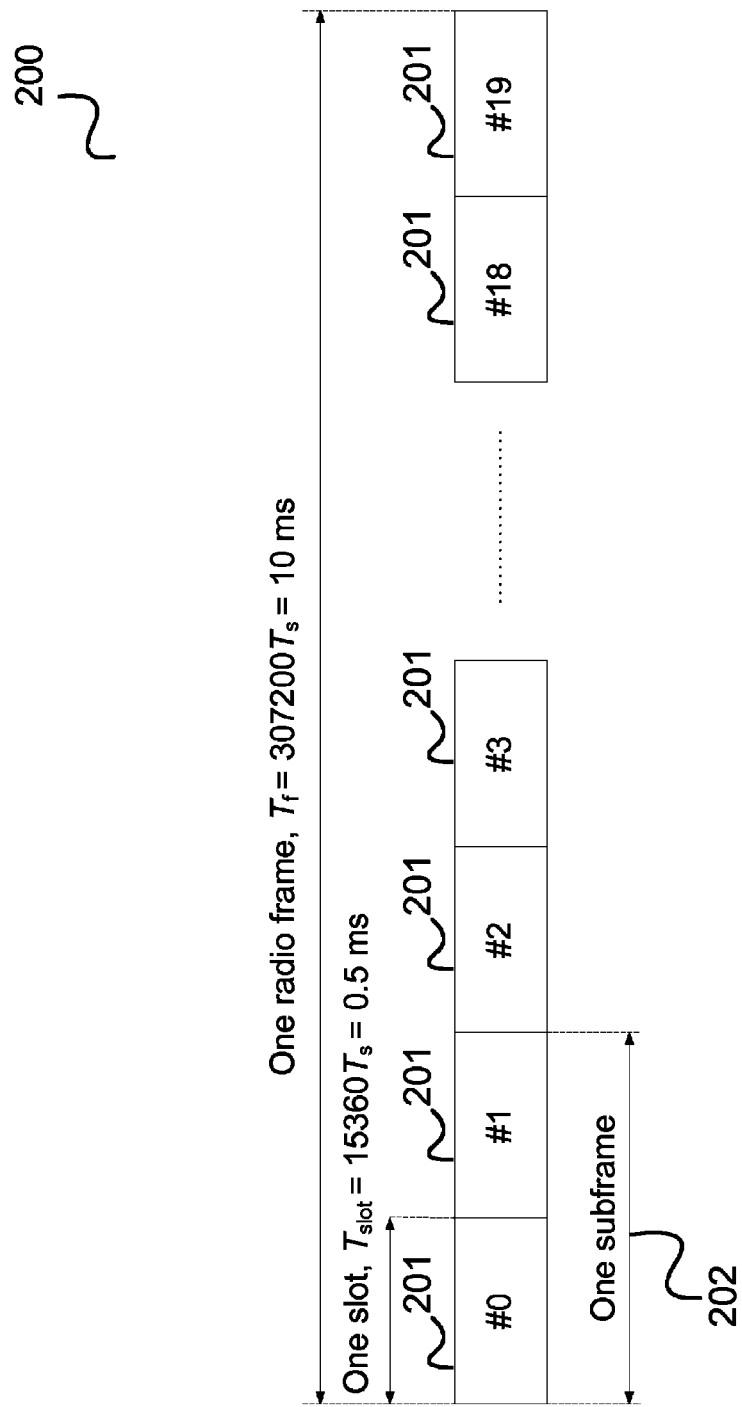
FIG. 2 shows a frame in accordance with an embodiment.

FIG. 2 shows a frame 200 in accordance with an embodiment.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval 10 subframes 202 are available for downlink transmissions or uplink transmissions. Uplink and downlink transmissions are separated in the frequency domain. Depending on the slot format a subframe 202 may include 14 or 12 OFDMA (orthogonal frequency division multiple access) symbols in DL (downlink) and 14 or 12 SC-FDMA symbols in UL (uplink), respectively.

In DL a subframe of length 1 ms is separated into a control channel region occupying a definite number of OFDMA symbols (up to 4 OFDMA symbols), and a PDSCH region occupying the remaining OFDMA symbols. The length of the control channel region and PDSCH region is configured by the network.

According to one embodiment, according to LTE DL and FDD mode, the following physical channels are specified:
PDSCH:
Carries user and control data and paging messages in downlink.
Occupies the OFDMA symbols in a subframe not occupied by PDCCH.
PDCCH:
Downlink physical channel only, i.e. no logical and transport channels are mapped to this channel.
Carries the control information related to DL/UL transmissions such as resource assignments and HARQ information.
Occupies 1, 2, 3 or 4 OFDMA symbols in the first slot in a subframe. The number of symbols is adjusted by network and signalled on PCFICH.
PCFICH:
Downlink physical channel.
Informs the UE about the number of OFDMA symbols used for the PDCCHs.
Occupies the first OFDMA symbol in the first slot in a subframe.
Is transmitted when the number of OFDMA symbols for PDCCH is greater than zero.
PHICH:
Downlink physical channel.
Carries Hybrid ARQ ACK/NACKs in response to uplink transmissions.
Occupies 1, 2, or 3 OFDMA symbols in the first slot in a subframe. The number of symbols is adjusted by network and signaled on P-BCH.
P-BCH:
Carries system information to be broadcast in the cell such as DL bandwidth information and number of OFDMA symbols assigned to PHICH.

With respect to cell search, i.e. synchronization to a radio cell 104 and identification of a radio cell 104, the following physical signals and physical channel may for example be used:
The PSS (Primary Synchronisation Signal) and SSS (Secondary Synchronisation Signal) are used to acquire slot and frame timing of a radio cell 104 and to determine the physical layer cell identity of the radio cell 104. The PSS and SSS are mapped in frequency-domain to 62 subcarriers around the DC (Direct Current) subcarrier and in time-domain to the last/second last OFDMA symbol in slots #0 and #10 in each radio frame.

The PBCH (Physical Broadcast Channel) is used to signal cell-specific physical layer information such as downlink bandwidth size and system frame number (SFN). The PBCH is mapped in frequency-domain to 72 sub-carriers around the DC subcarrier, and in time-domain to the first four OFDMA symbols in slot #1 in each radio frame. Overall, the PBCH carries the following cell-specific physical layer information:
DL bandwidth size (3 bits)
PHICH configuration (3 bits)
System Frame Number (8 bits)
Spare (10 bits)

Figure 3:
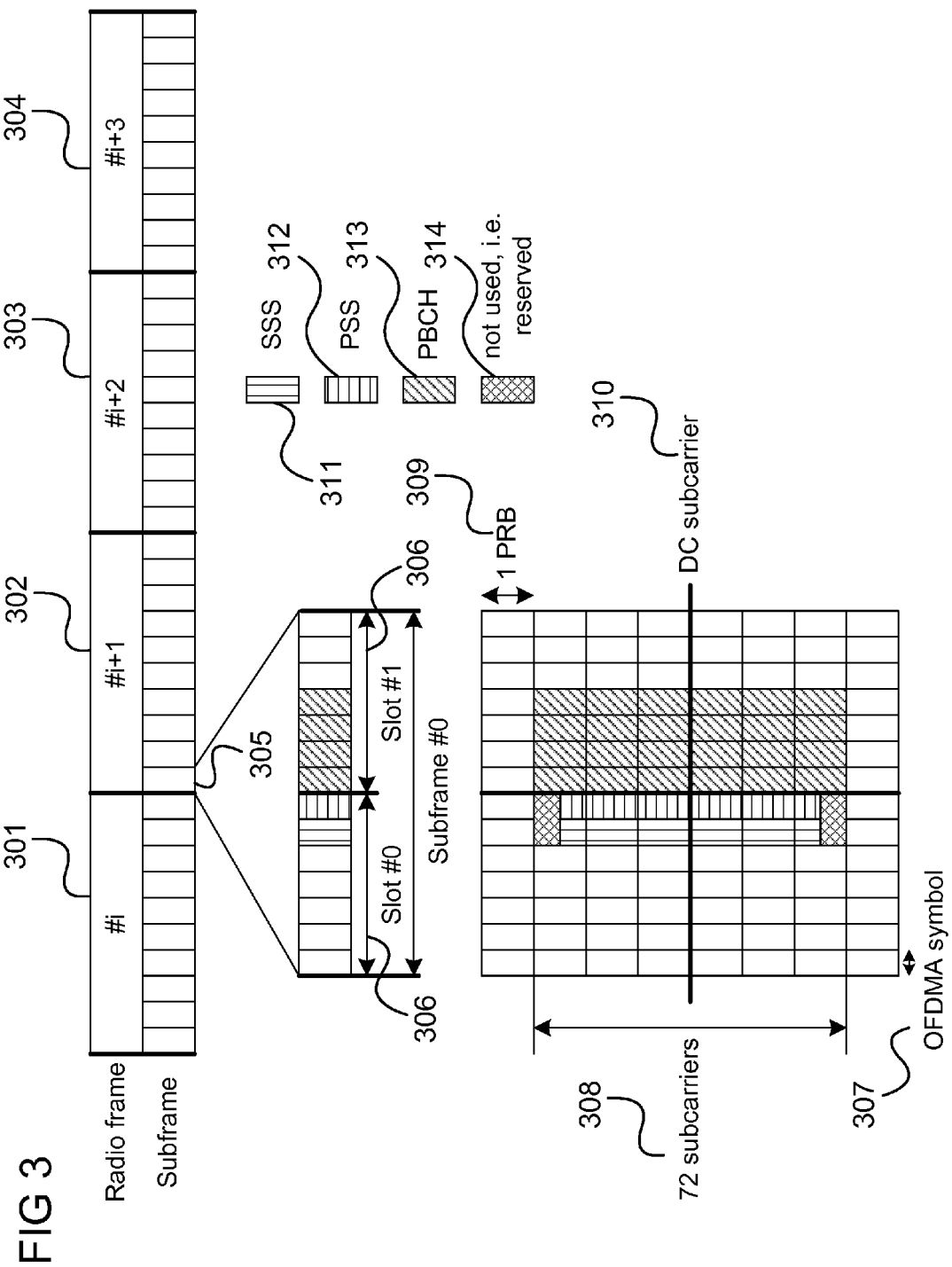
FIG. 3 shows an OFDMA symbol allocation according to one embodiment.

The time and frequency position of the resources for transmitting the PSS, the SSS and the PBCH is illustrated in FIG. 3.

FIG. 3 shows an OFDMA symbol allocation according to one embodiment.

Four radio frames 301, 302, 303, 304 are shown in FIG. 3, each having the structure as explained above with reference to FIG. 2, i.e. each including 10 subframes 305 wherein each subframe 305 includes two slots 306.

In this embodiment, each slot may include 7 OFDMA symbols 307 for each of 72 sub-carriers 308. A physical resource block 309 includes a matrix of 12 subcarriers by 7 OFDMA symbols 307.

The DC subcarrier 310 is the subcarrier around the carrier frequency.

A first hatching 311 indicates the radio resources used for the SSS in subframe #0, a second hatching 312 indicates the radio resources used for the PSS in subframe #0, and a third hatching 313 indicates the radio resources used for the PBCH in subframe #0. A fourth hatching 314 indicates unused, e.g. reserved, radio resources in subframe #0. Subframe #0 in a radio frame includes slot #0 and slot #1 of this radio frame.

In one embodiment, according to LTE, system-specific and cell-specific parameters are broadcast to all mobile terminals 105 in a radio cell 104 as system information using for example
the Broadcast Control Channel (BCCH) logical channel which is mapped on to the Broadcast Channel (BCH) transport channel and is physically sent an the Physical Broadcast Channel (PBCH) via the air Interface; and
the Broadcast Control Channel (BCCH) logical channel which is mapped on to the Downlink Shared Channel (DL-SCH) transport channel and is physically sent on the Physical Downlink Shared Channel (PDSCH) via the air Interface.

Overall, a large amount of system information may be transmitted to all mobile terminals 104 located in the radio cell. According to the nature of the information, the information may be grouped into various blocks, also referred to as System Information Blocks (SIBs).

For the efficient control of radio resources and communication connections between a mobile terminal 105 and a base station (eNodeB) 103 two connection states are in one embodiment, according to LTE, specified at the RRC protocol layer, the state RRC_IDLE (also referred to as idle mode) and the state RRC_CONNECTED (also referred to as connected mode). These RRC states and the transitions between these states are illustrated in FIG. 4.

Figure 4:
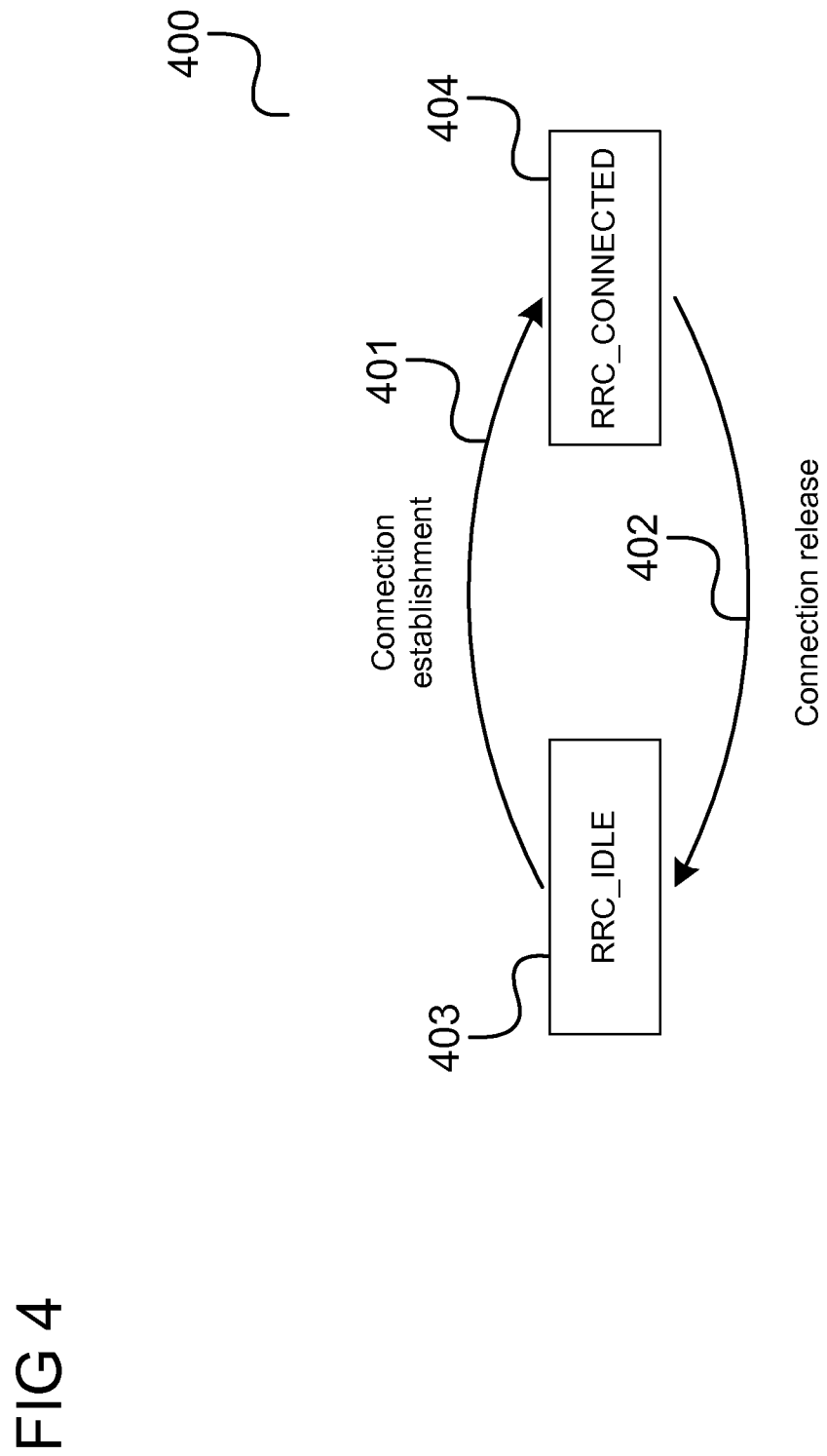
FIG. 4 shows a state transition diagram according to an embodiment.

FIG. 4 shows a state transition diagram 400 according to an embodiment.

A first state transition 401 from RRC_IDLE state 403 to RRC_CONNECTED state 404 for example occurs when a communication connection is established between the respective mobile terminal 105 and the respective base station 103.

A second state transition 402 from RRC_CONNECTED state 404 to RRC_IDLE state 403 for example occurs when a communication connection between the respective mobile terminal 105 and the respective base station 103 is released.

RRC_CONNECTED state 404 and RRC_IDLE state 403 may for example be characterized as follows.

RRC_IDLE:
No RRC connection is established
The UE position (i.e. the position of the respective mobile terminal 105) is known by the network (i.e. the E-UTRAN 101 and/or the core network 102) at tracking area level (a tracking area defines a group of radio cells 104 where the mobile terminal 105 in RRC_IDLE state registers and where the mobile terminal 105 is paged in case of an incoming communication attempt);
The mobile terminal 105 performs cell (re-)selection;
The mobile terminal 105 acquires system information which is broadcast in the radio cell 104;
No transmission of user and control data in uplink and downlink by the mobile terminal 105 and the base station 103;
The mobile terminal 105 monitors a paging channel to receive notification about incoming calls or modification of system information;

RRC_CONNECTED:
An RRC connection is established between the mobile terminal 105 and the base station 103;
The mobile terminal 105 is connected to one radio cell 104 only and based on measurements reported by the mobile terminal 105 (e.g. received signal strength of reference signals of detected neighboring radio cells 104) network controlled mobility is performed by explicit handover and cell change order;
The mobile terminal 105 position is known by the network at cell area level;
The mobile terminal 105 acquires system information which are broadcast in the radio cell;
Transmission of user and control data in uplink and downlink;
The mobile terminal 105 monitors a paging channel to receive notification about modification of system information.

The RRC connection is defined as a point-to-point bidirectional connection between RRC peer entities in the mobile terminal 105 and the base station 103. According to one embodiment, there is either none or one RRC connection between a mobile terminal and a base station.

A mobile terminal 105 according to LTE as in one embodiment that is in RRC_IDLE state performs cell selection/reselection. Mobile radio cell selection is the process in which the mobile terminal searches for a suitable mobile radio cell of the selected PLMN (public land mobile network) to camp on. The mobile radio cell selection process is triggered after power-on of the mobile terminal. Mobile radio cell reselection is the process in which the mobile terminal regularly searches for a more suitable cell of the selected PLMN to camp on. The mobile radio cell reselection process may be triggered after camping on a suitable cell. A suitable mobile radio cell may be defined as a mobile radio cell that among other is not barred and on which the mobile terminal may camp on to obtain normal service. UE shall select/reselect a cell according to cell selection/reselection criteria. In general, cell selection/reselection is based on a "best cell" principle, i.e. based on measurements the mobile terminal finds the strongest cell (in terms of received signal quality) to camp on. Subsequently, if a better radio cell (e.g. a cell with better received signal quality) is found, that radio cell may be selected by the mobile terminal.

In one embodiment, the communication system 100 may, according to UMTS based on W-CDMA and FDD mode, apply macro-diversity transmission which is also referred to as soft handover. In soft handover the mobile terminal 105 has radio links to more than one mobile radio cell 104. Soft handover is applied for intra-frequency mobile radio cells (i.e. mobile radio cells 104 operating in the same frequency band) only and the mobile terminal 105 may be required to support a maximum of six radio links to different base stations 103. In downlink the same user data is transmitted over all radio links to the mobile terminal 105. In uplink user data is decoded in all involved radio cells and base stations (NodeBs) and delivered to the radio network controller (RNC) for combining. The mobile terminal 105 and the radio access network 101 maintain an "Active Set" (AS) defined as the set of radio links simultaneously involved in the communication between the mobile terminal 105 and the radio access network 101. Based on measurements reported by mobile terminal 105 (e.g. the received signal strength of a common pilot channel of detected neighbouring radio cells 104) the radio access network 101 controls which radio cells 104 to add/replace/remove in the Active Set. The main principle may be seen in that the Active Set should contain only the strongest cells, i.e. the radio cells 104 with the best received signal quality. The main advantage of soft handover may be seen in that the link quality between the base stations 103 and the mobile terminal 105 can significantly be improved. A disadvantage of soft handover may be seen in that radio resources of multiple cells are required, and additional downlink interference is created in multiple radio cells 104.

The current discussions in 3GPP are focused on the further advancement of LTE in Release 10 in terms of spectral efficiency, cell edge throughput, coverage and latency based on the agreed requirements. This is also referred to as LTE-Advanced (LTE-A). Key technologies include relaying, UL MIMO (multiple input multiple output) with up to (4×4) antennas, DL MIMO with up to (8×8) antennas, Coordinated Multipoint Transmission/Reception (CoMP), support of bandwidths >20 MHz and up to 100 MHz by spectrum aggregation, flexible spectrum usage/spectrum sharing, and inter-cell interference management.

One of the key characteristics of LTE-Advanced may be seen in the support of bandwidths >20 MHz and up to 100 MHz by spectrum aggregation, i.e. the bandwidth of an LTE-Advanced (LTE-A) radio cell will be composed of a number of so-called component carriers (CC), in where the bandwidth size of each component carrier is limited to a maximum of 20 MHz. The component carriers may be adjacent or non-adjacent, and in FDD mode asymmetric allocation of DL and UL component carriers is considered, i.e. different number of component carriers of different bandwidths in UL and DL.

Further, an LTE-A radio cell is required to be backward compatible to Release 8 (Rel-8) LTE mobile terminals with radio frequency TX/RX (transmit/receive) capability of 20 MHz, i.e. at least one of the component carriers needs to be configured/operated Rel-8 LTE-compliantly.

In one embodiment, the communication system 100 is operated in accordance with LTE-A. Exemplary radio frequency (RF) deployment scenarios according to one embodiment, in accordance with LTE-A operating in FDD mode, are illustrated in FIG. 5.

Figure 5:
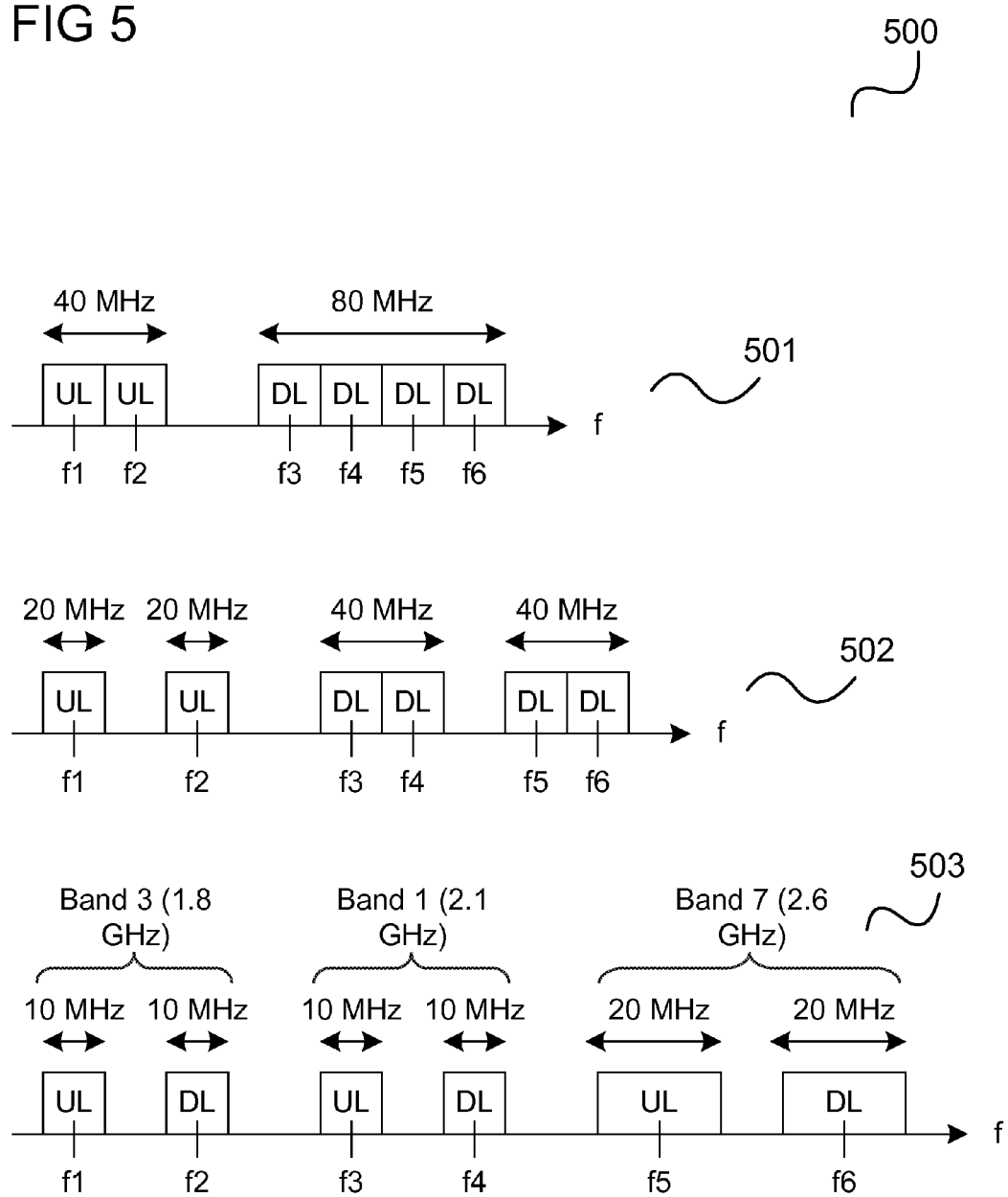
FIG. 5 shows frequency allocation diagrams.

FIG. 5 shows frequency allocation diagrams 501, 502, 503.

A first frequency allocation diagram 501 shows a first scenario being a single band, contiguous and asymmetric RF deployment scenario in UL/DL, wherein the bandwidth size of each component carrier is 20 MHz. The UL is composed of two adjacent component carriers characterized by the carrier frequencies f1 and f2 (i.e. 40 MHz UL contiguous). The DL is composed of four adjacent component carriers characterized by the carrier frequencies f3 to f6 (i.e. 80 MHz DL contiguous).

Analogously, a second frequency allocation diagram 502 illustrates a second scenario being a Single band scenario with 80 MHz DL (non-contiguous) and 40 MHz UL (non-contiguous).

A third frequency allocation diagram 503 illustrates a third scenario being a multi band scenario with 40 MHz in UL and DL (non-contiguous).

An LTE-A UE, i.e. a mobile terminal according to LTE-A, may simultaneously receive or transmit on one or multiple component carriers depending on its RF capabilities. But due to technical constraints the RF TX/RX (radio frequency transmitting/receiving) capability of LTE-A UEs is expected to be <100 MHz. According to LTE-A, a UE in idle mode is required to camp on (at least) one suitable component carrier.

Regarding mobile terminal operation in connected mode when carrier aggregation is used the following may apply according to one embodiment.

A base station may signal to an LTE-A UE via dedicated RRC signaling a so-called UE DL Component Carrier Set (UE DL CC set), i.e. a set of DL component carriers on which the mobile terminal may be scheduled to receive the PDSCH in the DL. Within the UE DL CC set, the component carriers are separated into one PCC (Primary Component Carrier) and zero, one or more SCCs (Secondary Component Carriers) depending on the QoS (quality of service) of the dedicated connection of the mobile terminal, the interference and load situation in the radio cell, the RF capability of the mobile terminal etc. The PCC and SCC can be configured specifically for each mobile terminal The PCC is the carrier on which the RRC connection is established, and is activated per default. The SCC is a carrier that can be configured in addition to the PCC, and needs to be activated explicitly.

Figure 6:
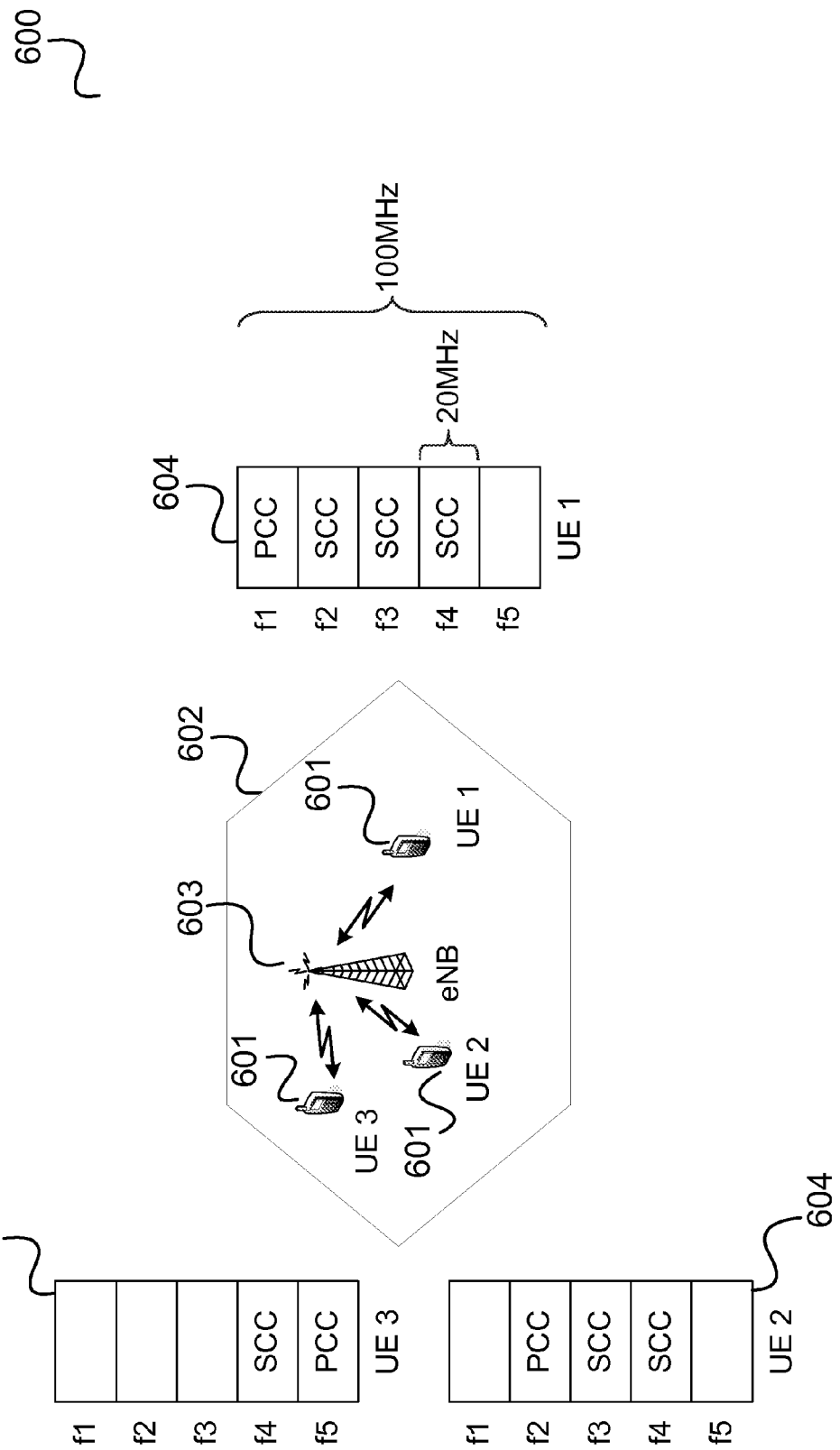
FIG. 6 illustrates a UE DL CC set configuration according to one embodiment.

FIG. 6 illustrates a UE DL CC set configuration according to one embodiment.

The configuration is illustrated for three mobile terminals (UE1, UE2, UE3) 601 (e.g. corresponding to mobile terminal 105 in FIG. 1) located in an LTE-A radio cell 602 (e.g. corresponding to radio cell 104 in FIG. 1) operated by a base station 603 (e.g. corresponding to base station 103 in FIG. 1).

In this example, five adjacent component carriers (characterized by carrier frequencies f1 to f5) of size 20 MHz each are used. Allocation diagrams 604 show an example of a possible allocation of the component carriers as SCC or PCC for the mobile terminals 601.

For downlink scheduling, two options may be used in one embodiment according to LTE-A. This is illustrated in FIG. 7.

Figure 7:
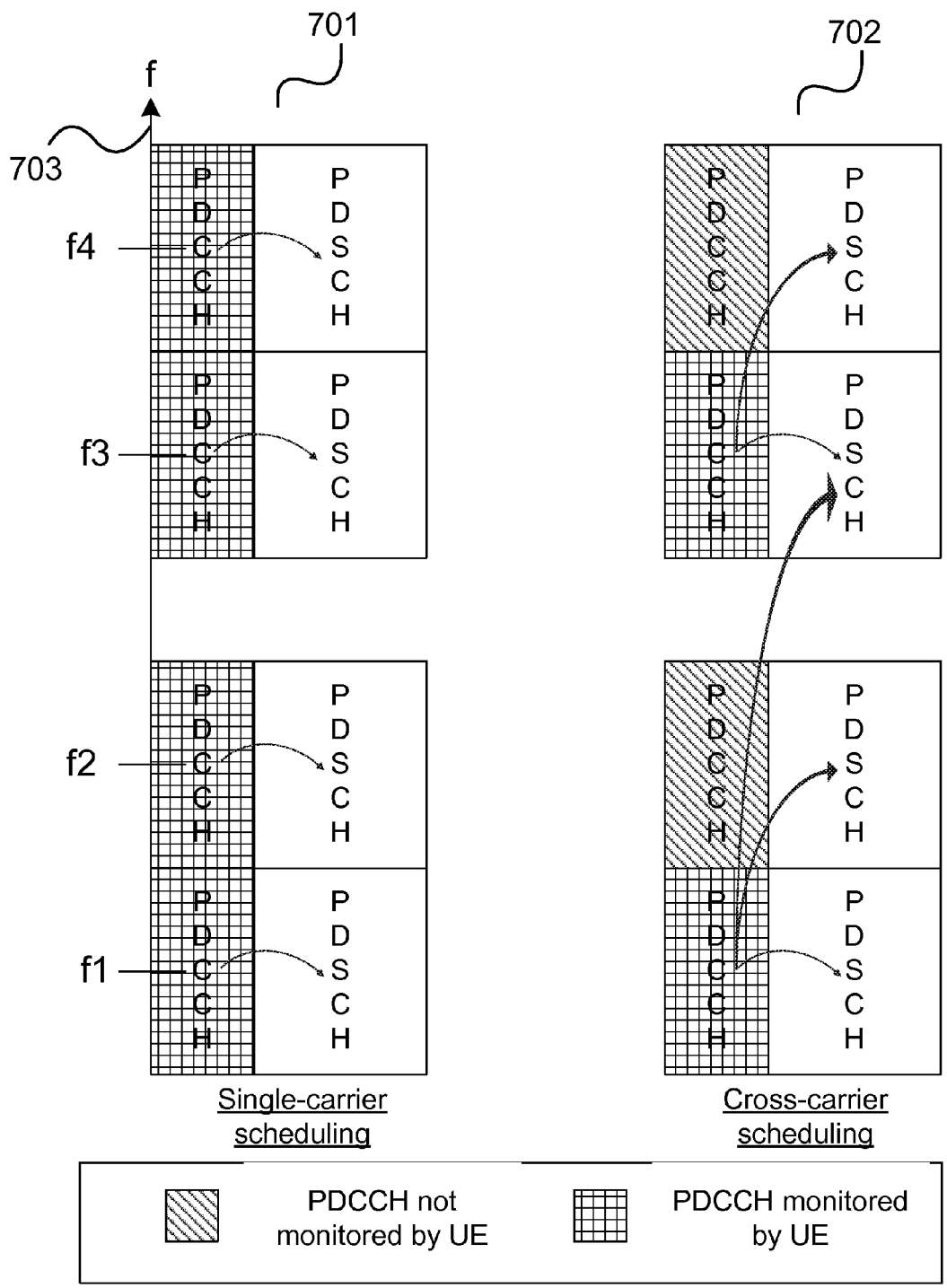
FIG. 7 illustrates downlink scheduling according to an embodiment in a first diagram and a second diagram.

FIG. 7 illustrates downlink scheduling according to an embodiment in a first diagram 701 and a second diagram 702.

The first diagram 701 illustrates single carrier scheduling. The mobile terminal 105 is required to monitor the PDCCH on all component carriers (indicated by center frequencies f1, f2, f3, f4 along frequency axis 703) as configured by the DL CC (downlink component carrier) set, and PDSCH resources can only be assigned for the same component carrier as used for the PDCCH signalling the assignment. This option is compliant to LTE Release 8.

The second diagram 702 illustrates cross carrier scheduling. The mobile terminal 105 is required to monitor the PDCCH on a smaller set of component carriers compared to single carrier scheduling (as indicated by the hatching). Using the PDCCH received via one compoment carrier PDSCH resources on multiple component carriers can be assigned.

This type of scheduling method may be beneficial for heterogeneous network deployment scenarios as a means for downlink interference control of downlink control signaling. For instance, the component carriers in each radio cell may be partitioned into two sets, one set used for data and control, and one set used mainly for data. Considering a heterogeneous network deployment scenario with a macro cell UE (i.e. a mobile terminal connected to a macro cell) operating using four CCs (characterized by the carrier frequencies f1 to f4) and two femto cell UEs (a first femto cell UE, i.e. a mobile terminal connected to a first femto cell, operating using two CCs characterized by the carrier frequencies f1 and f2 and a second femto cell UE, i.e. a mobile terminal connected to a second femto cell, operating using two CCs characterized by the carrier frequencies f3 and f4), cross-carrier scheduling may be applied as follows: the macro cell UE is scheduled (i.e. receive the PDCCH) via the CCs characterized by the carrier frequencies f1 and f3, whereas the femto cell UEs are scheduled only via the CCs characterized by the carrier frequencies f2 (for the first femto cell UE) and f4 (for the second femto cell UE).

Methods and procedures to apply for the initial configuration of the UE DL CC set in case of the RRC state transition from idle mode to connected mode (e.g. due to an incoming call) as well as the maintenance of UE DL CC set in connected mode have not yet been discussed in 3GPP.

A simple approach for this may be to apply the existing methods and procedures as specified in Rel-8 for LTE and leave the configuration and maintenance of the UE DL CC set to the specific network implementation.

For instance, the initial configuration of the UE DL CC set in case of the RRC state transition from idle mode to connected mode due to an incoming call may be carried out as follows:

In idle mode the mobile terminal sends an RRC connection request message to the base station on the uplink component carrier associated with the downlink component carrier the mobile terminal is camped on.

As response, the mobile terminal receives an RRC connection setup message from the base station on the associated downlink component carrier with which mobile terminal receives the configuration for establishing the dedicated radio connection between the mobile terminal and the base station and with which the mobile terminal is switched to connected mode.

Regarding the configuration of the UE DL CC set the base station can configure the number of downlink component carriers as well as the PCC and SCC depending on the QoS of the dedicated connection of the mobile terminal, interference and load situation in the cell, RF capability of the mobile terminal etc. The PCC may be configured to the downlink component carrier on which the RRC connection setup message has been sent to the mobile terminal and the SCCs may be configured to the downlink component carriers adjacent to the PCC.

Further, in connected mode the UE DL CC set may be maintained by the base station based on measurements reported by the mobile terminal (e.g. received signal strength of reference signals of detected neighbour cells) in the manner that always the "best component carrier" (i.e. the component carrier having the highest signal strength) is selected as the PCC.

The above described approaches for configuring the UL DL CC set may be seen to be efficient for homogenous network deployments wherein the coverage in the cell is provided by a macro base station only. However, such approaches may be less efficient in case of heterogeneous network deployment scenarios where low power nodes (e.g. pico eNBs, home eNBs, relay nodes) are placed throughout a macro cell providing small area coverage and sharing the same spectrum. Such a scenario is illustrated in FIG. 8.

Figure 8:
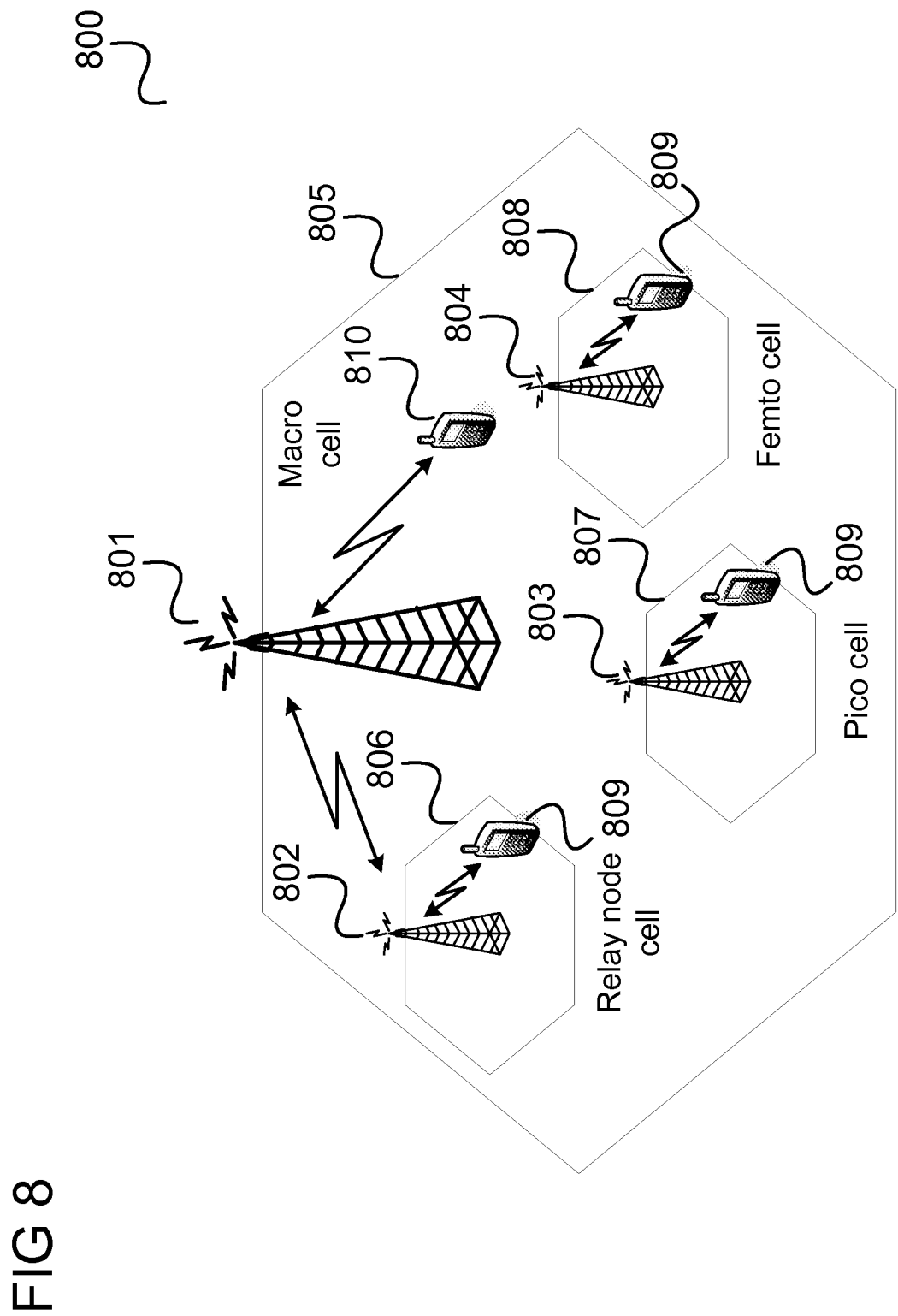
FIG. 8 shows a communication arrangement according to an embodiment.

FIG. 8 shows a communication arrangement 800 according to an embodiment.

The communication arrangement includes a first network node 801, e.g. a first base station, operating a macro cell 805, a second network node 802 implemented by a relay node operating a relay node cell 806, a third network node 803 implemented by a pico eNodeB operating a pico cell 807, and a fourth network node 804, e.g. a home eNodeB, operating a femto cell 808. One or more of the network nodes 801 to 804 may for example correspond to one or more of the base stations 104 in FIG. 1. The relay node cell 806, the pico cell 807, and the femto cell 808 are at least partially located in the macro cell 805. A mobile terminal 810 and other mobile terminals 809 for example corresponding to the mobile terminal 105 in FIG. 1 may communicate with the network nodes 801 to 804 depending on the radio cell or radio cells 805 to 808 in which they are located or on which they are camped on. In this example, the moble terminal 810 is camped on the macro cell 805 and has for example a connection to the first network node 801 (also referred to as macro cell base station) operating the macro cell 805. The other mobile terminals 809 are for example camped on the relay node cell 806, the pico cell 807, or the femto cell 808.

It should be noted that the term network node is used herein to include components of the radio access network such as base stations, relay nodes, home eNodeBs etc.

In a heterogeneous network deployment scenario such as the one shown in FIG. 8, inter-cell interference coordination for cell-edge mobile terminals, i.e. mobile terminals located at the edge of a radio cell 805 to 808, may be a key issue due to fast-changing interference conditions from location to location (e.g. due to uncoordinated deployment of home eNBs), and from time to time (e.g. due to variable traffic load at each low power node). Low power nodes may be understood as base stations (eNodeBs or relays) having a transmission power similar to that of a mobile terminal For instance, a cell-edge macro mobile terminal (i.e. a mobile terminal located in the macro cell 805 and connected to the macro eNB, i.e. the first network node 801) may be interfered by a neighbouring home eNB providing femto cell coverage, e.g. the fourth network node 804.

In one embodiment, in view of future heterogeneous network deployment scenarios methods and procedures are provided to apply for an optimum configuration of the DL CC set for a mobile terminal 105, 810 located in a macro cell 805. According to one embodiment, an advantageous solution is proposed that enables the radio access network 101 to determining the optimum DL CC set for a mobile terminal 105, 810. A primary objective may according to one embodiment be seen in reducing the impact of interference originated from low power nodes in the macro cell 805 and to protect the dedicated connection between the mobile terminal 105, 810 and base station 801 in the macro cell 805.

Figure 9:
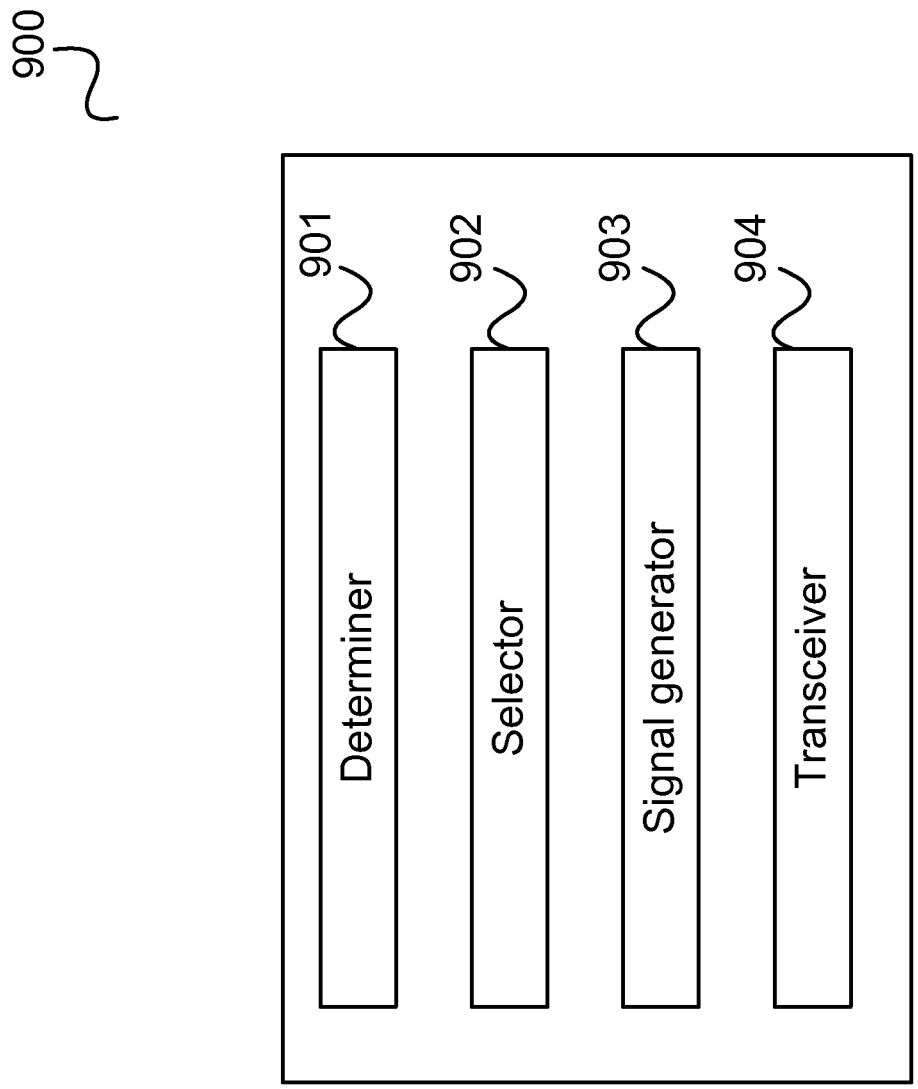
FIG. 9 shows a communication terminal according to one embodiment.

A communication terminal according to one embodiment is illustrated in FIG. 9.

FIG. 9 shows a communication terminal 900 according to one embodiment.

The communication terminal 900 includes a determiner 901 configured to determine, for a frequency region, a plurality of first communication devices from which the communication terminal receives a signal via the frequency region and a selector 902 configured to select at least one of the first communication devices based on a predetermined interference criterion.

The communication terminal 900 further includes a signal generator 903 configured to generate a signal with an identification of the at least one selected first communication device and a transceiver 904 configured to transmit the signal to a second communication device, to receive an indication from the second communication device specifying whether the communication terminal should use the frequency region for data communication with the second communication device, and to carry out data communication with the second communication device using the frequency region depending on the indication.

The various components of the communication terminal 900 (and similarly components of other embodiments) may be implemented using one ore more circuits. In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Illustratively, the mobile terminal selects itself the first communciation devices, e.g. potential interferers to the data communication using the frequency region, that it reports to the second communication device. For example, the mobile terminal may select that or those first communciation devices, from which it receives signals at the highest reception strength (or at best reception quality) and that can therefore be expected to be the strongest interferers to the data communication by the mobile terminal using the frequency region. However, the interference criterion may not only mean that or those first communication devices are selected from which the signals with highest reception strength (e.g. electric field strength or reception power) are received but may include also other criteria such as the movement speed of the first communication devices or of the mobile terminal, the duration for which a signal has been received from a first communication device, or the operation area of the first communication devices. For example, when the mobile terminal is moving fast and a signal has only been received recently from a first communication device having a small operation area (e.g. a network node having a small service area such as a hot spot) the mobile terminal may decide to not select the first communication device (i.e. not report the first communication device to the second communication device) since it may be expected that the service area of the first communication device will soon be left and signals by the first communication device will soon not interfere with data communication by the mobile terminal using the frequency region. Thus, a consideration of the first communication device by the second communication device when determining whether the frequency region should be used for data communication by the mobile terminal that is unnecessary since the signal of the first communication device will not be received any longer soon can be avoided. In other words, the mobile terminal judges itself which first communication devices are to be expected to cause (most) interference when using the frequency region and can provide the second communication device with this information to allow the second communciation device to make an efficient decision on the usage of the frequency region by the mobile terminal.

For example, in an LTE-A scenario, the mobile terminal provides for the Optimum configuration of the UE DL CC set in Connected mode its radio frequency capabilities in terms of supported band combinations and maximum aggregated bandwidth to its serving base station via an RRC message and in addition provides component carrier related measurement results (which may be seen to correspond to measurements of signals received via certain frequency regions) in terms of a number of component carriers to report and a number of strongest interferers for each reported component carrier to its serving base station via an RRC message based on criteria that are for example defined by base station.

Based on the radio frequency capabilities and component carrier related measurement results received from mobile terminal the serving base station for example determines the optimum configuration of the primary and secondary component carriers in the UE DL CC set and signals this configuration to the mobile terminal. Further, as a means for inter-cell interference coordination in heterogeneous network deployment scenarios, the serving base station may send indications in terms of scheduling mode change and maximum transmission power reduction to the neighbour low power nodes as identified by the mobile terminal in order to protect the dedicated connection between the mobile terminal and the base station in the cell operated by the base station.

In one embodiment, the selector is configured to select a first communication device if the interference criterion is fulfilled for the first communication device.

The communication terminal may further include a measuring circuit configured to measure, for each first communication device, the received signal strength of the signal received from the first communication device and the selector may select the at least one first communication device based on the received signal strength of the signal received from at least one first communication device. In other words, for example, the interference criterion is fulfilled for a first communication device depending on the received signal strength of the signal received from the first communication device.

In one embodiment, the selector is configured to select a first communication device if the received signal strength of the signal received from the first communication device is above a predetermined threshold.

The transceiver may further be configured to receive an indication of the predetermined threshold from the second communication device. For example, the predetermined threshold is determined by a base station and signalled to the mobile terminal.

In one embodiment, the selector is configured to select the at least one first communication device based on a comparison of the received signal strengths of the signals received from the first communication devices. For example, the selector is configured to select the one or more first communication devices from which signals are received having the highest signal strengths among the first communication devices.

The communication terminal may further include a further determiner configured to determine a level of interference for the at least one selected first communication device, wherein the signal generator is further configured to generate a further signal indicating the level of interference of the at least one selected first communication device and wherein the transceiver is configured to transmit the further signal to the second communication device. The level of interference of a first communciation device is for example an indication of the signal strength (e.g. in terms of signal power) at which the signal is received by the mobile terminal.

In one embodiment, the further determiner is configured to determine the level of interference based on the received signal strength of the signal received from the at least one selected first communication device.

The communication terminal is for example a user terminal of cellular radio communication network.

The second communication device is for example a base station.

The first communication devices may be communication network nodes such as base stations, relay communication devices, or other communication devices, such as low power communication devices or other communication terminals.

In one embodiment, the transceiver transmits the signal in the context of requesting the establishment of a communication connection between the communication terminal and the second communication device and wherein the indication from the second communication device specifies whether the communication terminal should use the frequency region for the communication connection to be established. For example the determination and selection of first communication devices and the reporting of the at least one selected first communciation device to the second communication device is carried out by the mobile terminal in context of switching from idle mode to connected mode (e.g. in course of the switching procedure or triggered by the switching procedure).

The determiner is for example configured to determine, for each of a plurality of frequency regions, a plurality of first communication devices from which the communication terminal receives a signal via the frequency region; the selector is configured to select at least one of the first communication devices based on a predetermined interference criterion for each frequency region; the signal generator is configured to generate a signal with an identification of the at least one selected first communication device for each frequency region; and the transceiver is configured to receive an indication from the second communication device specifying at least one of the frequency regions the communication terminal should use for data communication with the second communication device and to carry out data communication with the second communication device using the frequency region depending on the indication.

For example, the frequency regions are component carriers (e.g. according to LTE-A) and the indication specifies which component carriers should be used by the communication terminal for data communication when it has a communication connection to the second communication device. For example, in other words, the indication may indicate the UE DL CC set for the mobile terminal when it is in RRC_Connected state.

Figure 10:
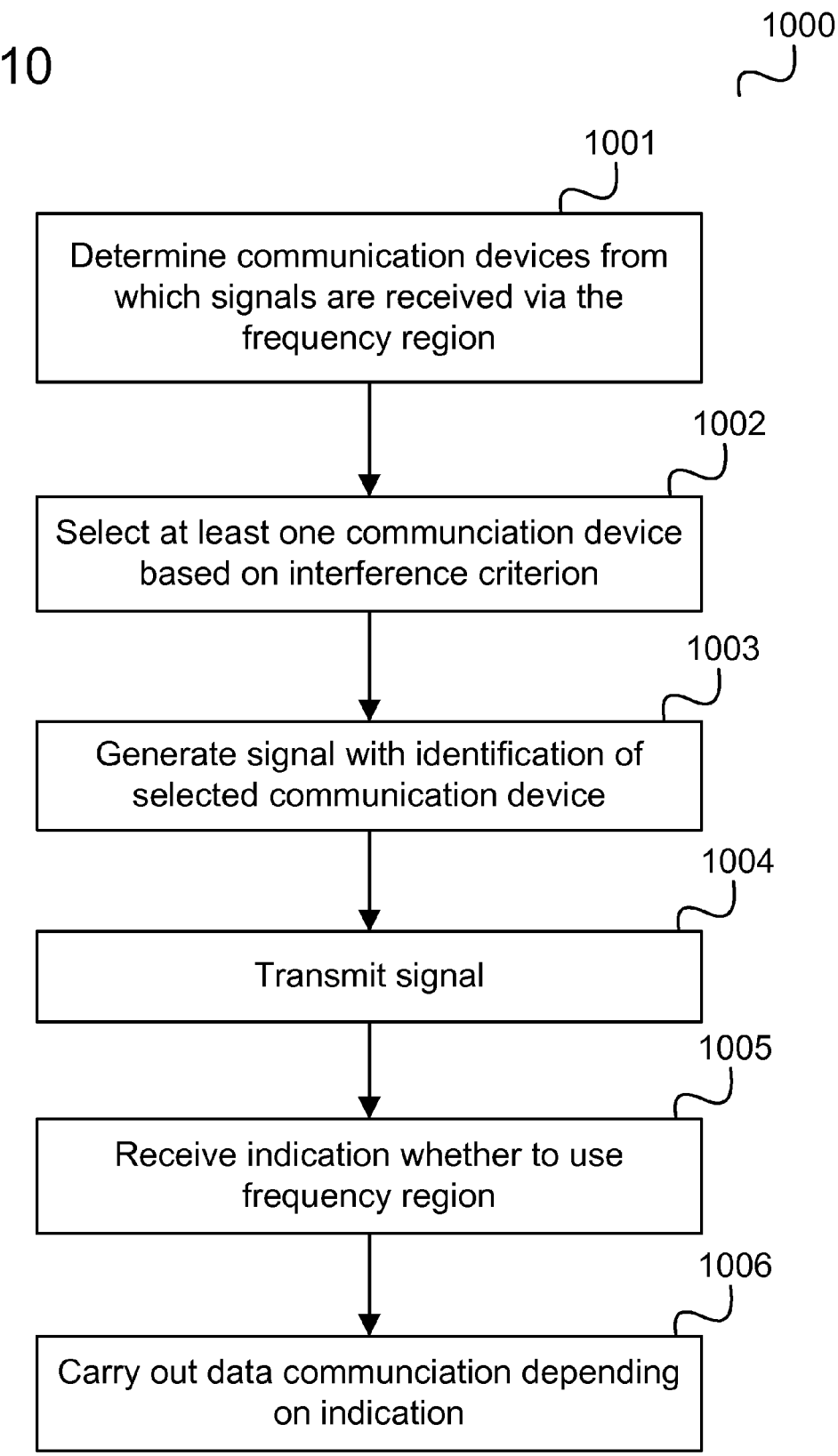
FIG. 10 shows a flow diagram according to an embodiment.

In one embodiment, the communication terminal 900 may carry out a method as illustrated in FIG. 10.

FIG. 10 shows a flow diagram 1000 according to an embodiment.

The flow diagram 1000 shows the flow of a method for data communication.

In 1001, for a frequency region, a plurality of first communication devices are determined from which a communication terminal receives a signal via the frequency region.

In 1002, at least one of the first communication devices is selected based on a predetermined interference criterion.

In 1003, a signal with an identification of the at least one selected first communication device is generated.

In 1004, the signal is transmitted to a second communication device.

In 1005, an indication is received from the second communication device specifying whether the communication terminal should use the frequency region for data communication with the second communication device.

In 1006, data communication between the communication terminal and the second communication device is carried out using the frequency region depending on the indication.

It should be noted that embodiments described in context of the communication terminal 900 are analogously valid for the method for data communication illustrated in FIG. 10, the communication device illustrated in FIG. 12 below and the method for frequency allocation illustrated in FIG. 13 below.

In the following, an embodiment is described in which the communication terminal is a mobile terminal 105, 810 as shown in FIGS. 1 and 8. The communication system 100 is assumed to be a communication system according to LTE-A, e.g. based on OFDMA/TDMA in downlink, SC-FDMA/TDMA in uplink, and operating in FDD mode.

As illustrated in FIG. 8, it is assumed that the mobile terminal 105, 810 is located in a macro radio cell 104, 805 whose coverage is provided by a (first) macro base station 103, 801 in a heterogeneous network deployment scenario. In addition to the first network node 103, 801, low power nodes (i.e. the second network node 802, the third network node 803, and the fourth network node 804) are placed throughout the macro cell 104, 805 using the same frequency spectrum for communication as the first network node 103, 801, e.g. all providing the communication connections to mobile terminals using at least one common frequency region.

For example, it is assumed that the macro radio cell 805 is operated based on five adjacent and backwards compatible component carriers (CC), characterized by carrier center frequencies f1 to f5. The bandwidth size of each component carrier is assumed to be set to 20 MHz. The second network node 802 (relay node) is in this example operated in the same spectrum as the macro eNB (i.e. the first network node) 801. The third network node 803 (pico eNB) and the fourth network node 804 (home eNB) also share the same spectrum with the macro cell 805 but are operated on less component carriers. The pico cell 807 is operated based on three adjacent and backwards compatible component carriers, characterized by the carrier center frequencies f2 to f4, whereas the femto cell 808 is composed of (i.e. operated based on) two adjacent and backwards compatible component carriers, characterized by the carrier center frequencies f4 and f5. This is illustrated in table 1.

TABLE 1

| Macro Cell | Relay node cell | Pico cell | Femto cell |
|---|---|---|---|
| f1 | f1 | | |
| f2 | f2 | f2 | |
| f3 | f3 | f3 | |
| f4 | f4 | f4 | f4 |
| f5 | f5 | | f5 |

In this embodiment, all backwards compatible component carriers operated by the one of the radio cells 805 to 808 transmit the same physical layer cell identity of the radio cell 805 to 808. This is applied for all cell types, so that the physical layer cell identity is different for different cells 805 to 808. The physical layer cell identity of a cell 805 to 808 can be determined by a mobile terminal after successful synchronization on a component carrier, i.e. after decoding the PSS (Primary Synchronisation Signal) and SSS (Secondary Synchronisation Signal) on a component carrier.

The macro cell 805 broadcasts, in this example, the following common values as system information on each component carrier:
Maximum number of component carriers to report: N=3
Quality threshold: Qn=X dB
Max number of strongest interferer to report: M=2
interference threshold: In=Y dBm In one embodiment, the mobile terminal 105, 810 located in the macro cell 805 measures regularly the signal quality of the component carriers and their strongest interferers based on the signalled values. Further, it regularly or event-driven transmits the measurement results to the serving eNB, i.e. to the first network node 801.

Further, in this embodiment, the mobile terminal 105, 810 transmits the following RF (radio frequency) capabilities to the first network node 801 via an RRC message:
Supported band combinations, e.g. with following values:
Band combination 1: Band I+Band II
Band combination 2: Band I+Band III
...
Band combination 16: Band V+Band VIII+Band XX
Supported maximum aggregated bandwidth per band, e.g. with following value range: [20, 30, 40, 50, 60, 70, 80, 90, 100] in MHz.

The frequency bands are for example as defined according to the 3GPP standard.

Further, in this embodiment, the mobile terminal 105, 810 transmits the following component carrier related measurement results to the first network node 801 via an RRC message:
Component carrier quality indication for a configurable number N of component carriers of the set of component carriers based on which the macro cell 805 is operated based on the physical layer cell identity of the macro cell 805. The mobile terminal 105, 810 measures the received signal power and/or quality of each component carrier based on the received reference signals, i.e. RSRP (reference signal received power) and/or RSRQ (reference signal received quality), and reports the component carrier whose signal quality is above the quality threshold Qn in form of a list of component carriers in decreasing order, i.e. the component carrier with the best signal quality appearing first, in this example for N=3:
1. Component carrier f3
2. Component carrier f5
3. Component carrier f1
As mentioned above, the number N of component carriers to report as well as the quality threshold Qn is defined by radio access network 101 and is broadcast to all mobile terminals in the cell 805 as system information on each component carrier. The number of reported component carriers may be smaller than N in case that the received signal power and/or quality of the candidate component carriers are below the configured quality threshold.

Indication of the strongest interferer for each reported component carrier, i.e. for each reported component carrier the mobile terminal selects and includes the M strongest interferers based on the physical layer cell identity whose received signal power and/or quality is above an interference threshold ln. The maximum number M of strongest interferers to report as well as the interference threshold ln is, as mentioned above, defined by radio access network 101 and broadcast to all mobile terminals as system information on each component carrier. In this example for M=2, the following may e.g. be reported:

1. Component carrier f3:
   a. Interferer 1: physical layer cell identity X1
   b. Interferer 2: physical layer cell identity X2
2. Component carrier f5
   a. Interferer 1: physical layer cell identity X3
   b. Interferer 2: physical layer cell identity X4
3. Component carrier f1
   a. Interferer 1: physical layer cell identity X5
   b. Interferer 2: physical layer cell identity X6

The number of reported interferers may be smaller than M in case that the received signal power and/or quality of the candidate interferers are below the configured interference threshold.

It should be noted that the mobile terminal 105 may select the interferers to report based on various interference criteria, e.g. as above select those interferers from which the mobile terminal 105 receives signals in the relevant frequency region, i.e., in this case, via the respective component carrier, with a reception quality or a reception signal level above a certain threshold. An interferer may be generally understood as a communication device from which the mobile terminal 105 receives signals that may interfere with signals that the communication device could use for communication in a certain frequency region.

In one embodiment, based on the RF capabilities and component carrier related measurement results received from the mobile terminal 105, the serving eNB determines the optimum DL CC set for the mobile terminal 105 in connected mode including the configuration of the Primary and Secondary component carriers in the UE DL CC set. For instance, the DL CC with the highest received signal power and/or quality may be configured as PCC.

Furthermore, an exchange of indications between network nodes 801 to 804 may be carried out. For example, as a means for inter-cell interference coordination the serving eNB, i.e. the first network node 801, may send following indications and requests to a network node (i.e. a neighbouring base station or a base station located in the macro cell 805), for example based on the fact that the mobile terminal 105 has identified the node as one of the strongest interferers for certain component carriers:

Request for a scheduling mode change for component carrier characterized by carrier center frequency fx, e.g. request to change scheduling mode from single-carrier to cross-carrier scheduling for component carrier characterized by carrier center frequency fx;

Request for maximum transmission power reduction for component carrier characterized by carrier center frequency fy.

Depending on the type of the network node the indications or requests are sent for example via following Interfaces:

The X2 interface 107 in case the indication/request is sent from the first network node 801 (macro cell base station) to a pico cell eNB (e.g. the third network node 803);

The S1 interface 108 in case the indication/request is sent from the first network node 801 (macro cell base station) to a home eNB (e.g. the fourth network node 804) as in one embodiment, there may be no X2 interface between a macro base station and a home eNB.

The Un interface (not shown in FIG. 1) in case the indication/request is sent from the first network node 801 (macro cell base station) to a relay node i.e. the second network node 802.

The functionalities of the mobile terminal 810 and the macro cell base station 801 enables the macro base station to determine an optimum (or at least, in terms of interference and radio resource usage very efficient) DL CC set for the mobile terminal 810 in connected mode located in the macro cell 805. Furthermore, the configuration of the Primary and Secondary component carriers in the UE DL CC set can be optimized. The serving base station, i.e. the macro cell base station 801 is furthermore provided with the interference situation in the macro cell 805 as experienced by the mobile terminal 810.

Additionally, the serving eNB 801 is enabled to reduce the impact of interference originated from low power nodes in heterogeneous network deployment scenarios and to protect the dedicated connection between the mobile terminal 810 and serving eNB 801 in the macro radio cell.

In the following, examples are given for a possible application of the above functionalities of the mobile terminal 810 and the macro cell base station 801 and for values of the parameters that are signaled between the mobile terminal 810 and the macro cell base station 801.

As a first example, it is assumed that the mobile terminal 810 is in RRC_IDLE state. Specifically, in this example an idle mode LTE-A UE is considered which is camped on component carrier f3.

Figure 11:
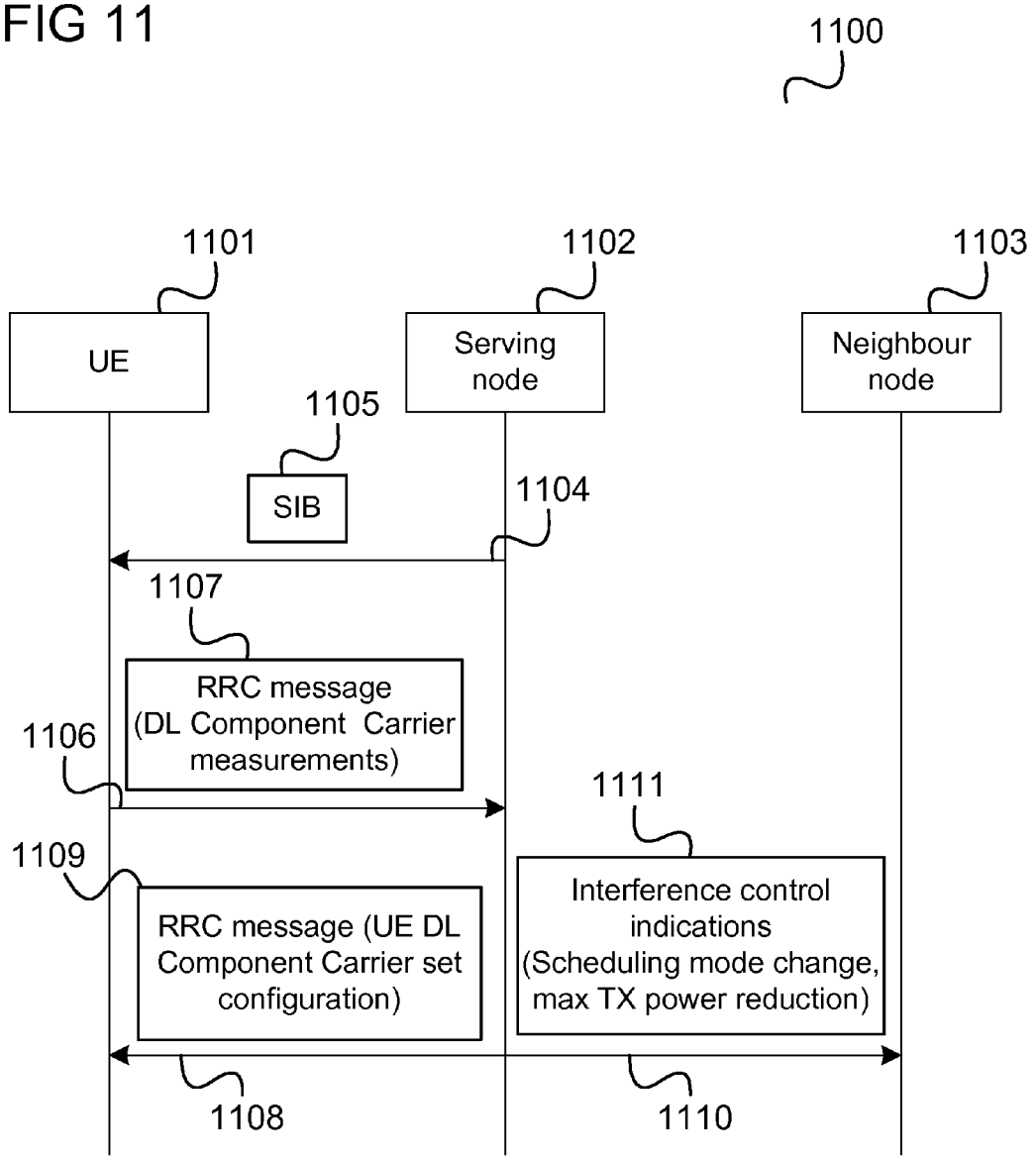
FIG. 11 shows a message flow diagram according to an embodiment.

The signalling flow in this example is illustrated in FIG. 11.

FIG. 11 shows a message flow diagram 1100 according to an embodiment.

The message flow takes place between a mobile terminal 1101 corresponding to the mobile terminal 810, a serving node 1102 corresponding to the macro cell base station 801 and a neighbour node 1103 which in this example corresponds to the fourth network node 804 but may also be any other kind of network node within the macro radio cell 805 or also in the vicinity of the macro radio cell 805.

In 1104, the mobile terminal 1101 receives system information 1105 from the serving node 1102 including the parameters as described above, i.e. the maximum number of component carriers to report etc.

In 1106, due to an incoming call the mobile terminal 1101 sends an RRC connection request message 1107 to the serving node (i.e. the macro cell base station) 1102 on the uplink component carrier associated with the downlink component carrier f3 it is camped on, i.e. the mobile terminal 1101 requests that a dedicated communication connection to the serving node 1102 is established. In this example, the following information is sent as part of the RRC connection request message 1107:

i) RF capabilities:
  Supported band combinations:
  Band combination 1: Band I+II
  Band combination 2: Band I+III Supported maximum aggregated bandwidth per band: 60 MHz ii) Component carrier related measurement results:
Component carrier quality indication:
1. Component carrier f3
2. Component carrier f4
3. Component carrier f1

Indication of the strongest interferer for each reported component carrier:
1. Component carrier f3:
   a. Interferer 1: physical layer cell identity of the pico cell
2. Component carrier f4
   a. Interferer 1: physical layer cell identity of the femto cell
   b. Interferer 2: physical layer cell identity of the pico cell
3. Component carrier f1
   a. none Based on the RF capabilities and component carrier related measurement results received from the mobile terminal 1101 and considering the QoS of the dedicated connection to be established, the interference, and the load situation in the macro cell the serving eNB 801 determines the Optimum DL CC set for the mobile terminal 1101 in connected mode including the configuration of the primary component carrier and secondary component carriers in the UE DL CC set. In 1108, as response to the reported parameters as above, the mobile terminal 1101 receives an RRC connection setup message 1109 from the serving node 1102 on the downlink component carrier f3 with which the mobile terminal 1101 receives the configuration for establishing the dedicated radio connection between the mobile terminal 1101 and the serving node 1102 and with which the mobile terminal 810 is switched to connected mode. In this example, regarding the initial configuration of the UE DL CC set the mobile terminal 1101 receives the following:

PCC: component carrier f3;
SCC: component carrier f4.

Further, as a means for inter-cell interference coordination the serving node 1102 sends in this example in 1110 the following indications 1111 to the neighbour node 1103 (i.e. the femto cell) over the S1 interface as the network node 804 operating the femto cell has been identified by the mobile terminal 1101 as the strongest interferer for component carrier f4:

Request for scheduling mode change for component carrier characterized by carrier center frequency f4, i.e. change scheduling mode from single-carrier to cross-carrier scheduling for component carrier characterized by carrier center frequency f4;

Maximum transmission (TX) power reduction for component carrier characterized by carrier center frequency f4: L dBm As second example, a connected mode LTE-A UE is considered which is located in the macro cell and whose UE DL CC set consists of the following component carriers:

PCC: component carrier f3;
SCC: component carrier f4.

For the maintenance of the UE DL CC set the mobile terminal 810 regularly sends a measurement report message to the macro cell base station 801 on the uplink component carrier associated with the PCC (component carrier f3). The component carrier related measurements are sent as part of the measurement report message.

Based on the component carrier related measurement results received from mobile terminal 810 and considering the QoS of the established dedicated connection, the interference and the load situation in the macro cell 805 the macro cell base station 801 determines the Optimum DL CC set for the mobile terminal 810 in connected mode including the configuration of the primary component carrier and the secondary component carrier in the UE DL CC set. As response to the reported parameters, the mobile terminal 810 may receive an RRC connection reconfiguration message from the macro cell base station 801 on the PCC with the reconfiguration of the UE DL CC set, e.g. a change of the PCC and adding/replacing/removing of one or more SCCs.

Further, as a means for inter-cell interference coordination the serving base station 801 may send an indication/request with respect to a scheduling mode change and/or a maximum transmission power reduction to one or more network nodes that have been identified by mobile terminal 810 as strongest interferer for certain component carriers.

Figure 12:
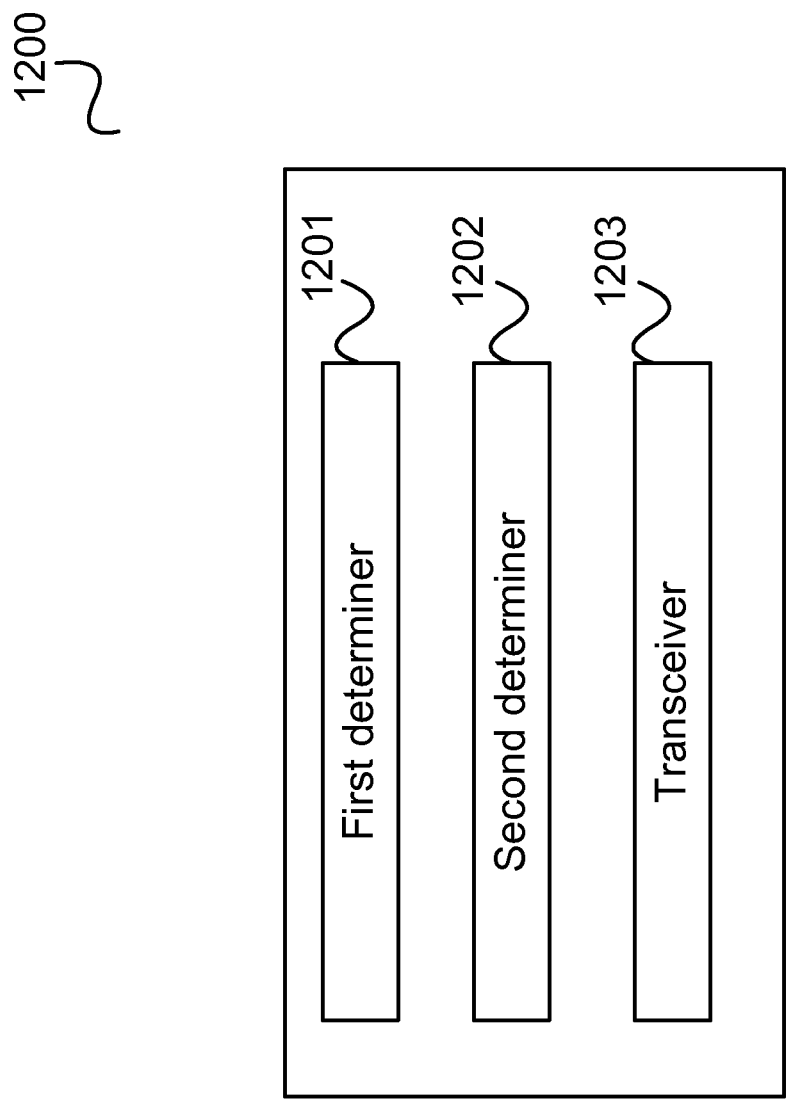
FIG. 12 shows a communication device according to an embodiment.

In one embodiment, a communication device is provided as illustrated in FIG. 12.

FIG. 12 shows a communication device 1200 according to an embodiment. The communication device 1200 includes a first determiner 1201 configured to determine, for a frequency region, an interference criterion according to which a communication terminal is to select at least one other communication device from a plurality of other communication devices from which the communication terminal receives a signal via the frequency region.

The communication device 1200 further includes a second determiner 1202 configured to determine, for the frequency region, a number of the other communication devices the communication terminal is to select from the plurality of other communication devices.

Additionally, the communication device 1200 includes a transceiver 1203 configured to transmit, for the frequency region, a first signal with a specification of the determined interference criterion and the determined number to the communication terminal, to receive, for the frequency region, for each of at least one of the other communication devices selected by the communication terminal an identification of the selected other communication devices and measurement information about the signal received by the communication terminal from the selected other communication devices, and to transmit a second signal with an indication specifying whether the communication terminal should use the frequency region for data communication with the communication device.

The communication terminal is for example a mobile terminal as explained with reference to FIG. 9 and the communication device 1200 for example corresponds to the second communication device in the context of the embodiments described with reference to FIG. 9. The measurement information is for example the received signal strength of the received signal from the selected first communication device.

The communication device 1200 for example carries out a method as illustrated in FIG. 13.

FIG. 13 shows a flow diagram 1300 according to an embodiment.

The flow diagram 1300 illustrates a method for frequency allocation.

In 1301, for a frequency region, an interference criterion is determined according to which a communication terminal is to select at least one other communication device from a plurality of other communication devices from which the communication terminal receives a signal via the frequency region.

In 1302, for the frequency region, a number of the other communication devices the communication terminal is to select from the plurality of other communication devices is determined.

In 1303, for the frequency region, a first signal with a specification of the determined interference criterion and the determined number is transmitted to the communication terminal.

In 1304, for the frequency region, for each of at least one of the other communication devices selected by the communication terminal an identification of the selected other communication device and measurement information about the signal received by the communication terminal from the selected other communication device is received.

In 1305, a second signal with an indication specifying whether the communication terminal should use the frequency region for data communication with the communication device is transmitted.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
    a determiner configured to determine, for a frequency region, a plurality of first communication devices from which the communication terminal receives a signal via the frequency region;
    a selector configured to select at least one of the first communication devices based on a predetermined interference criterion;
    a signal generator configured to generate a signal with an identification of the at least one selected first communication device;
    a transceiver configured to transmit the signal to a second communication device, to receive an indication from the second communication device specifying whether the communication terminal should use the frequency region for data communication with the second communication device, and to carry out data communication with the second communication device using the frequency region depending on the indication.

2. The communication terminal according to claim 1, wherein the selector is configured to select a first communication device if the interference criterion is fulfilled for the first communication device.

3. The communication terminal according to claim 1, wherein the communication terminal further comprises a measuring circuit configured to measure, for each first communication device, the received signal strength of the signal received from the first communication device and wherein the selector selects the at least one first communication device based on the received signal strength of the signal received from at least one first communication device.

4. The communication terminal according to claim 3, wherein the selector is configured to select a first communication device if the received signal strength of the signal received from the first communication device is above a predetermined threshold.

5. The communication terminal according to claim 4, wherein the transceiver is further configured to receive an indication of the predetermined threshold from the second communication device.

6. The communication terminal according to claim 1, wherein the selector is configured to select the at least one first communication device based on a comparison of the received signal strengths of the signals received from the first communication devices.

7. The communication terminal according to claim 6, wherein the selector is configured to select the one or more first communication devices from which signals are received having the highest signal strengths among the first communication devices.

8. The communication terminal according to claim 1, further comprising a further determiner configured to determine a level of interference for the at least one selected first communication device, wherein the signal generator is further configured to generate a further signal indicating the level of interference of the at least one selected first communication device and wherein the transceiver is configured to transmit the further signal to the second communication device.

9. The communication terminal according to claim 8, wherein the further determiner is configured to determine the level of interference based on the received signal strength of the signal received from the at least one selected first communication device.

10. The communication terminal according to claim 1, wherein the communication terminal is a user terminal of cellular radio communication network.

11. The communication terminal according to claim 10, wherein the second communication device is a base station.

12. The communication terminal according to claim 1, wherein the first communication devices are base stations, relay communication devices, or low power communication devices.

13. The communication terminal according to claim 1, wherein the transceiver transmits the signal in the context of requesting the establishment of a communication connection between the communication terminal and the second communication device and wherein the indication from the second communication device specifies whether the communication terminal should use the frequency region for the communication connection to be established.

14. The communication terminal according to claim 1, wherein
    the determiner is configured to determine, for each of a plurality of frequency regions, a plurality of first communication devices from which the communication terminal receives a signal via the frequency region;
    the selector is configured to select at least one of the first communication devices based on a predetermined interference criterion for each frequency region;
    the signal generator is configured to generate a signal with an identification of the at least one selected first communication device for each frequency region; and
    the transceiver is configured to receive an indication from the second communication device specifying at least one of the frequency regions the communication terminal should use for data communication with the second communication device and to carry out data communication with the second communication device using the frequency region depending on the indication.

15. The communication terminal according to claim 14, wherein frequency regions are component carriers and the indication specifies which component carriers should be used by the communication terminal for data communication when it has a communication connection to the second communication device.

16. A method for data communication comprising:
    determining, for a frequency region, a plurality of first communication devices from which a communication terminal receives a signal via the frequency region;

selecting at least one of the first communication devices based on a predetermined interference criterion;
generating a signal with an identification of the at least one selected first communication device;
transmitting the signal to a second communication device;
receiving an indication from the second communication device specifying whether the communication terminal should use the frequency region for data communication with the second communication device, and
carrying out data communication between the communication terminal and the second communication device using the frequency region depending on the indication.

* * * * *